(12) United States Patent
Scaldaferri et al.

(10) Patent No.: US 8,937,403 B2
(45) Date of Patent: Jan. 20, 2015

(54) CURRENT LIMITED LINEAR AND SWITCHING REGULATORS

(75) Inventors: Stefano Scaldaferri, Munich (DE); Christian Wolf, Gauting (DE); Eric Marschalkowski, Kirchheim/Teck-Nabern (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 821 days.

(21) Appl. No.: 13/135,159

(22) Filed: Jun. 27, 2011

(65) Prior Publication Data

US 2012/0319484 A1 Dec. 20, 2012

(30) Foreign Application Priority Data

Jun. 20, 2011 (EP) .................................... 11392006

(51) Int. Cl.
*H02J 1/10* (2006.01)
*H02M 1/10* (2006.01)
*H02M 3/156* (2006.01)

(52) U.S. Cl.
CPC .. *H02J 1/10* (2013.01); *H02M 1/10* (2013.01); *H02M 3/156* (2013.01)
USPC ........................................................ 307/52

(58) Field of Classification Search
USPC .......................................................... 307/52
See application file for complete search history.

(56) References Cited

U.S. PATENT DOCUMENTS

| | | | |
|---|---|---|---|
| 6,522,190 B1 | 2/2003 | Malik et al. | |
| 6,972,969 B1 * | 12/2005 | Shteynberg et al. | 363/21.12 |
| 6,995,599 B2 * | 2/2006 | Huang et al. | 327/408 |
| 7,132,764 B2 | 11/2006 | Kumar et al. | |
| 7,709,976 B2 | 5/2010 | Bazinet | |
| 8,427,123 B2 * | 4/2013 | Dearborn | 323/282 |
| 2002/0057080 A1 * | 5/2002 | Telefus et al. | 323/283 |
| 2006/0087303 A1 * | 4/2006 | Hartular et al. | 323/283 |
| 2006/0158158 A1 * | 7/2006 | Eberlein | 323/222 |
| 2006/0164773 A1 * | 7/2006 | Stanford et al. | 361/93.1 |
| 2007/0018502 A1 | 1/2007 | Bazinet | |

FOREIGN PATENT DOCUMENTS

EP 2 325 986 5/2011

OTHER PUBLICATIONS

European Search Report—11392006.0-2207, Mail date—Dec. 13, 2011, Dialog Semiconductor GmbH.

* cited by examiner

*Primary Examiner* — Jared Fureman
*Assistant Examiner* — Duc M Pham
(74) *Attorney, Agent, or Firm* — Saile Ackerman LLC; Stephen B. Ackerman

(57) ABSTRACT

Circuits and methods for current limited DC-to-DC converters having multiple power sources have been disclosed. One of multiple power sources is activated by a multiplexer. A current sensing unit, deployed close to the multiplexer, detects if an input current to the DC-to-DC converter has reached a current limit. In case the current limit is reached a signal is sent to the DC-to-DC converter to reduce the current drawn the DC-to-DC converter.

17 Claims, 2 Drawing Sheets

CURRENT LIMITED LINEAR AND SWITCHING REGULATORS

BACKGROUND OF THE INVENTION (1) Field of the Invention

This invention relates generally to the field of DC-to-DC converters and relates more specifically to current limited DC-to-DC converters having multiple power sources.

(2) Description of the Prior Art

The performance of DC-to-DC converters is key for mobile electronic devices. DC-to-DC converters are often used to supply power for electronic devices as well as charging batteries at the same time if possible, i.e. if enough energy is available for both electronic devices and batteries. A limit to the input current of such DC-to-DC converters protects the power sources supplying the input for the DC-to-DC converter and the DC-to-DC converter itself and smoothes the output current of the converter.

Every modern integrated power management system has to be able to accommodate for a broad range of voltage sources (USB, 5V wall adapter, Firewire, automotive battery). Each of them comes in a variety of output specs, in particular regarding nominal output voltage and maximum current capability. The power management unit (PMU) has to guarantee that in every circumstance the load seen by the power source is within the specified ranges. This is generally done imposing a current limitation on the PMU according to the kind of power source connected to it.

Multiple power sources can be used to achieve a more stable operation of a DC-to-DC converter.

There are patents or patent publications dealing with the operation of DC-to-DC converters using multiple power sources.

U.S. Patent Application Publication (US 2007/0018502 to Bazinet) discloses a system for supplying power from multiple power sources to a powered device having first and second input power supplies for respectively providing power from first and second power sources. An input selector circuit is responsive to the first and second input power supplies for producing an input power supply signal provided to a power regulator, such as a DC-DC converter, for generating a regulated output power supply signal. The power regulator includes a first transistor device controlled to support conversion of the input power supply signal into the output power supply signal if the input power supply signal is provided by the first input power supply, and a second transistor device controlled to support conversion of the input power supply signal into the output power supply signal if the input power supply signal is provided by the second input power supply.

U.S. Pat. No. 7,132,764 to Kumar et al. proposes an apparatus and method for regulating multiple input voltages for a microelectronics device. The apparatus includes a controller configured to maintain each of the multiple input voltages supplied to one or more microelectronics devices within a range. The controller may be further configured to maintain input voltage according to a lower limit providing a wider regulation window for the power supply to operate without sacrificing performance for the microelectronics device or degrading its reliability. In one embodiment, the controller is configured to statically or dynamically adjust a gain factor for of a feedback loop in order to maintain the device input voltage according to a regulating loadline.

U.S. Pat. No. 6,522,190 to Malik et al. discloses a highly efficient power supply with redundant multiple input voltage sources. The power supply uses switching transistors, specifically MOSFET's, to create paths for current from one of the voltage sources to the load. The switching transistors are switched either "on" or "off" by comparators which compare the output from the voltage sources. These comparators allow the highest voltage source to provide power to the load, and keep the other switching transistors "off" that connect the common load to other voltage sources. Because the switching transistors have lower conduction losses than diodes in conventional power supplies, the power supply in accordance with the present invention is more efficient.

SUMMARY OF THE INVENTION

A principal object of the present invention is to achieve a current limited DC-to-DC converter providing a smooth input current limit.

A further object of the present invention is to integrate current sensing functionality into power multiplexing for multiple power supply input applications.

A further object of the present invention is to achieve a current limited DC-to-DC converter having an improved performance Moreover a further object of the present invention is to achieve a smooth input current sensing.

In accordance with the objects of this invention a method for improving the performance of current limited DC-to-DC converters has been achieved. The method invented comprises, firstly, the steps of: (1) providing a DC-to-DC converter, a multiplexer switch unit connected to the DC-to-DC converter capable to activate one of multiple power sources at a point of time having integrated means to sense active input currents, and a means to detect if an input current reaches a current limit, (2) sensing available power sources, and (3) selecting one of the power sources having a voltage above a voltage threshold by closing a corresponding multiplexer switch, Furthermore the method comprises (4) sensing an input current of the DC-to-DC converter from the power source selected, (5) checking if the input current from the power source selected reaches its current limit and, if so, go to step (6), otherwise go to step (4), and (6) reducing the input current drawn by the DC-to-DC converter and go to step (4).

In accordance with the objects of this invention a system to convert DC-to-DC voltage having a current limit and improved performance has been achieved. The system invented comprises: a multiplexing switch unit having multiple inputs and outputs, wherein each input is connected to a power source and a first output is a power output to a DC-to-DC converter and a second output delivers a signal to the DC-to-DC converter if an input current exceeds a maximum limit, wherein the multiplexing switch unit comprises current sensing means attached to each switch of the switch unit, and wherein only one of the switches is closed forming an active power path through said multiplexer, said current sensing means, wherein the sensing means that is connected to said active power path initiates, in case a current through said current sensing unit reaches a maximum current limit, a signal to the DC-to-DC converter to reduce a current drawn by a load of the DC-to-DC converter, and said DC-to-DC converter.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and systems to achieve a DC-to-DC converter providing a well-regulated input current and a high performance. The DC-to-DC converter of the present invention is characterized by having more than one power sources, a multiplexer connecting the most suitable power source to the DC-to-DC converter via a current sensing unit of each power path of a multiplexer. The invention is applicable to all kinds of DC-to-DC converters, such as switched mode converters and linear converters.

The invention can be applied to current limited switched converters as e.g. buck converters, boost converters, or buck/boost converters as ell as to other types of current limited types of DC-to-DC converters as e.g. LDO converters. A typical application of the present invention is related to non-regulated power sources that have strict maximum current limitations, i.e. a current drawn from them must not exceed a specified value.

Figure 1A:
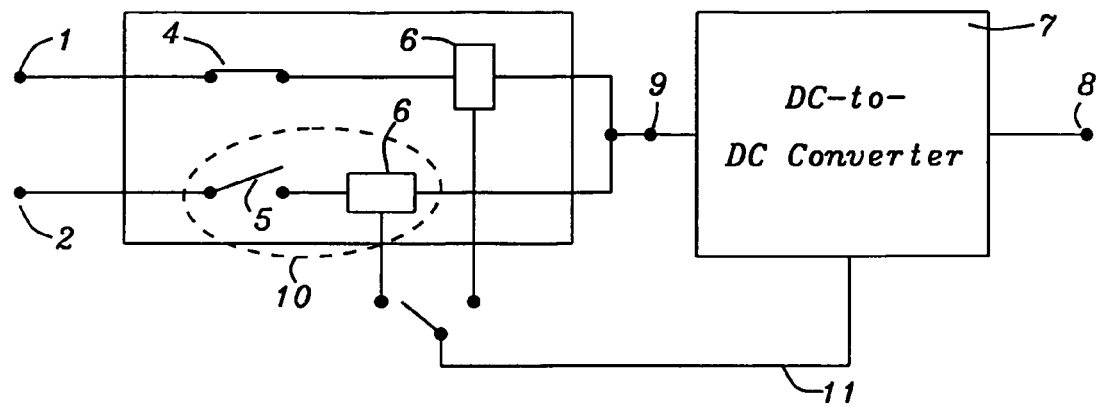
FIG. 1a illustrates a block diagram of the basic functions of the power supply of a DC-to-DC converter.

FIG. 1a illustrates a block diagram of the basic functions of the present invention. Provided are two power sources 1 and 2, e.g. USB and firewire. It should be noted that more than two power sources could also be used with the present invention. Furthermore FIG. 1a shows a multiplexing switching unit 3 having two main switches 4 and 5 wherein each main switch is connected to a power source and to an input current sensing unit 6. Only one power source 1 or 2 is exclusively connected via multiplexing main switches 4 or 5 and via a corresponding input current sensing unit 6 to a DC-to-DC converter 7 having an input port 9 and an output port 8. A connection 11 is provided between the current sensing units 6 and the converter 7 to limit the load current.

An important feature of the invention is that a input current sensing functionality 6 is integrated in the power multiplexing block 3 for different input applications, thus providing a smoother current sensing than in the switching pass device of the DC-to-DC converter 7, which is burdened with a lot of noise.

In case the current through an active power path, which is formed by a closed switch of the multiplexing switch unit 3 exceeds a defined maximum current limit the correspondent current sensing unit 6 initiates a reduction of the correspondent input current limit via a current limit control of the DC-to-DC converter 7.

It should be understood that FIG. 1a shows only an example of an embodiment of the present invention. The invention could be applied to more than two power sources as well.

It has to be noted that moving the current sensing to the input side of the DC-to-DC converter relaxes the design requirements and introduces an inherent filtering of the current sensing information and improves the behavior of the buck in current limit operation.

Figure 1B:
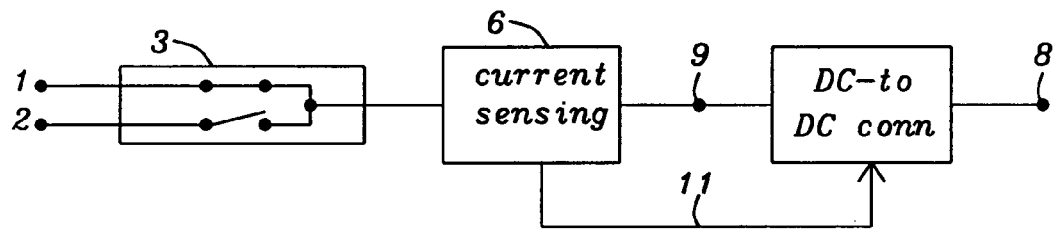
FIG. 1b illustrates an alternative block diagram of the basic functions of the power supply of a DC-to-DC converter.

FIG. 1b illustrates an alternative block diagram of the basic functions of the power supply of a DC-to-DC converter. The difference to the block diagram shown in FIG. 1a is that only one current sense unit 6 is required and the selection of the different power sources 1 or 2 is performed in the multiplexer unit 3.

Figure 2:
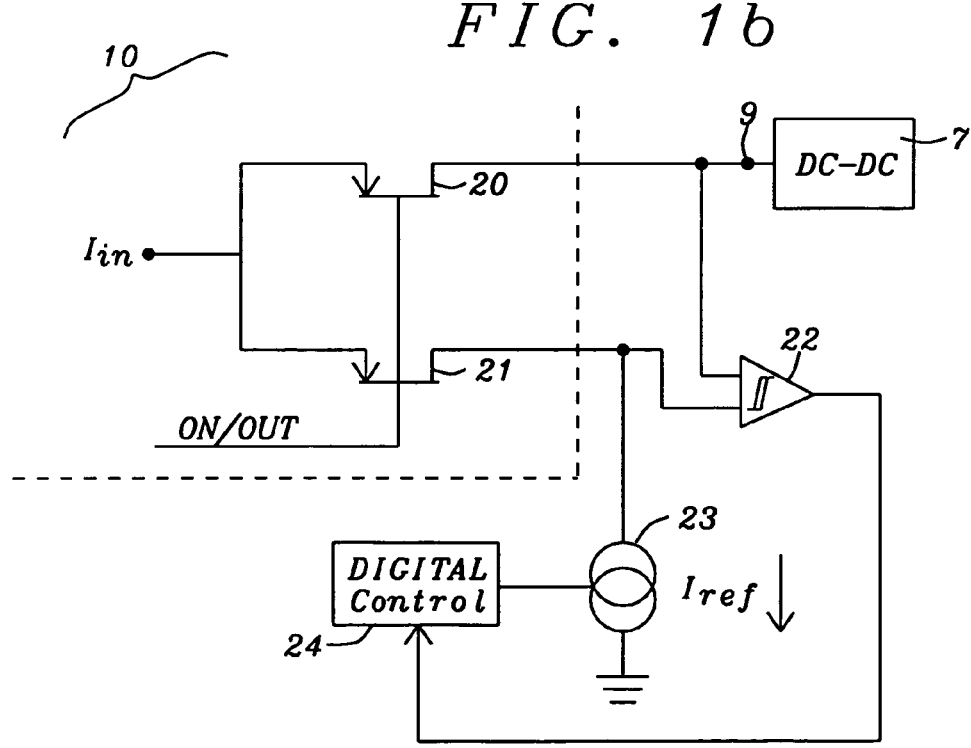
FIG. 2 illustrates in more detail a preferred embodiment of a current sensing unit and related power switch.

FIG. 2 illustrates in more detail a preferred embodiment of a current sensing unit and related power switch, i.e. the area 10 circled the a dotted line of FIG. 1, and how it can be integrated with the other components. The embodiment of FIG. 2 shows an active power path from power source 2 i.e. switch 5 is closed and switch 4 is open.

The switching/current sensing unit of FIG. 2 comprises a main pass device 20 and a sensing transistor 21. A programmable current source 23 generates a reference current $I_{ref}$. The reference current $I_{ref}$ can be set by a digital control unit 24. A voltage comparator 22 compares the drain source voltages of the main pass device 20 and of the sensing transistor 21. The main pass device 20 is furthermore connected to the input 9 of the DC-to-DC converter. The sensing transistor 21 is matched and scaled in regard to the main pass device 20, in a preferred embodiment it is scaled in a ratio of 10000:1.

It should be noted that each power path has its own main pass device 20 and sensing transistor 21. The reference current source 23, the comparator 22 and the digital control can be shared between all power paths.

Assuming that e.g. a current limit of $I_{LIMIT}$=100 mA for the input current $I_{in}$ is defined and that a scale factor between the main pass device and the sensing transistor is 10000:1. Then, according to the scale factor of 10000:1, a reference current $I_{REF}$=10 uA is imposed across sensing transistor 21. In this way the comparator 22 will trip when the source-drain voltages across the main switch 20 and the sense transistor 21 are be the same, i.e. when the current across the main switch is $I_{MAIN}$=10000*$I_{REF}$=100 mA, i.e. correspondent to the defined current limit $I_{LIMIT}$. An according signal is then sent to the DC-to-DC converter 7 in order to activate a reduction of the current drawn from the input.

Initially a power path is selected depending on which port a power source is detected. Normally this is implemented via a voltage comparator that checks if the voltage on the port has exceeded a specified threshold. Each power source is compared to a threshold and, if higher, the corresponding switch is closed. If multiple power sources are above threshold priority is given to one of them.

Figure 3:
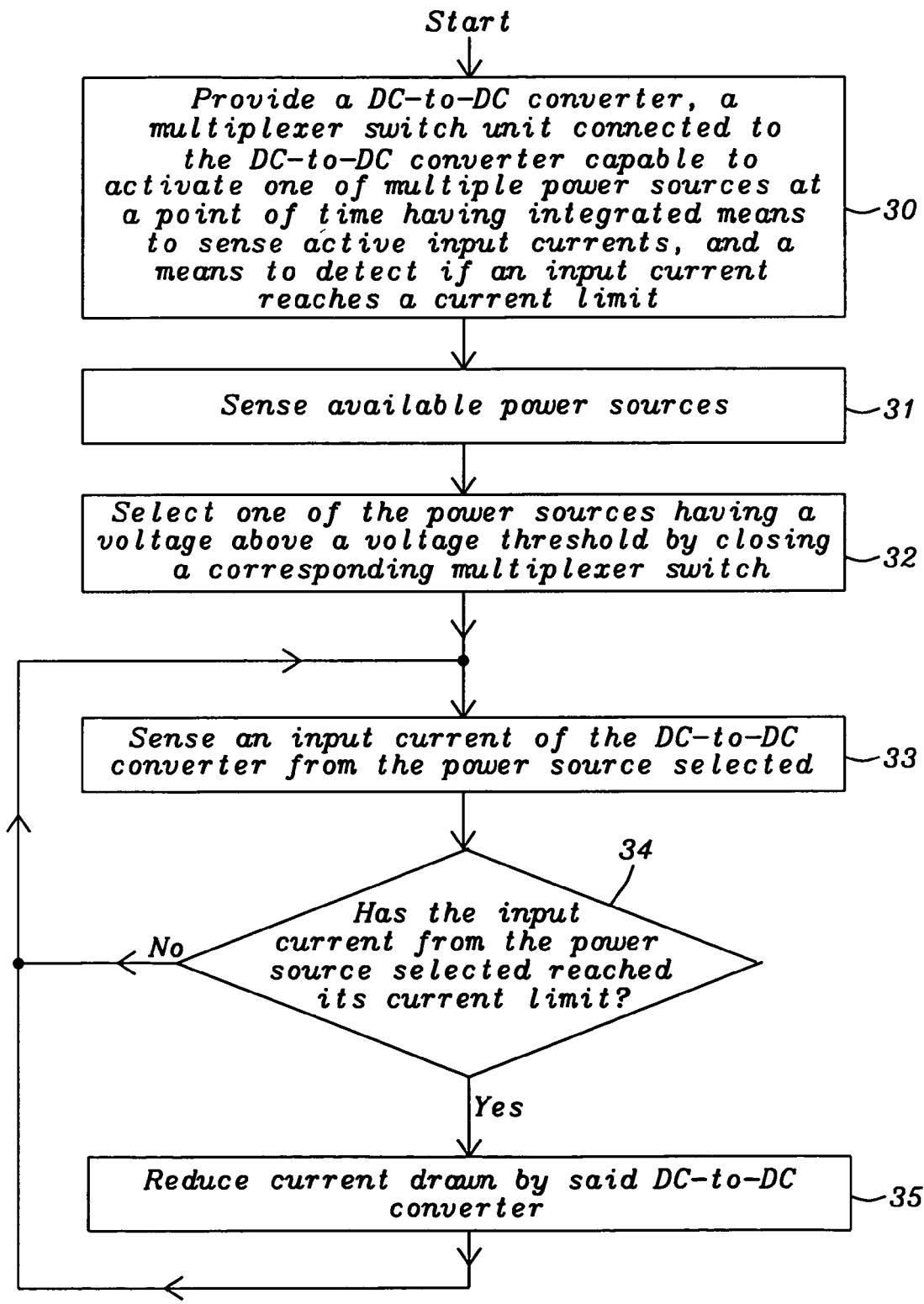
FIG. 3 illustrates a flowchart of a method invented to control the input current of a DC-to-DC converter.

FIG. 3 illustrates a flowchart of a method invented to improve the performance of DC-to-DC converters having multiple input power sources. A first step 30 describes the provision of a DC-to-DC converter, a multiplexer switch unit connected to the DC-to-DC converter capable to activate one of multiple power sources at a point of time having integrated means to sense active input currents, and a means to detect if an input current reaches a current limit. In the following step 31 available power sources are sensed and step 32 describes a selection of one of the power sources having a voltage above a voltage threshold by closing a corresponding multiplexer switch. In step 33 the input current of the DC-to-DC converter, provided by the power source selected, is sensed The following step 34 is a check if the input current from the power source selected has reached a defined current limit and, if so, the process flow goes to step 35, otherwise the process flow goes back to step 33 again. In step 35 the current drawn by the DC-to-DC converter is reduced.

While the invention has been particularly shown and described with reference to the preferred embodiments thereof, it will be understood by those skilled in the art that various changes in form and details may be made without departing from the spirit and scope of the invention.

What is claimed is:

1. A method for improving the performance of current limited DC-to-DC converters comprising the steps of:
    (1) providing a DC-to-DC converter, a multiplexer switch unit comprising a single power output and multiple input branches wherein each input branch of the multiplexer switch unit is connected to one of multiple power sources and each input branch comprises a pass transistor switch and an integrated current sensing means and wherein the power output of the multiplexer switch is connected to the DC-to-DC converter, wherein the multiplexer switch unit is capable to activate one of multiple power sources at a point of time, wherein the integrated current sensing means are sensing active input currents, and a means to detect if an input current reaches a current limit;

(2) sensing available power sources;

(3) selecting one of the power sources having a voltage above a voltage threshold by closing a corresponding multiplexer switch;

(4) sensing an input current of the DC-to-DC converter from the power source selected;

(5) checking if the input current from the power source selected reaches its current limit and, if so, go to step (6), otherwise go to step (4); and (6) reducing the input current drawn by the DC-to-DC converter and go to step (4).

2. The method of claim 1 wherein said DC-to-DC converter is a switched converter.

3. The method of claim 2 wherein said switched converter is a buck converter.

4. The method of claim 2 wherein said switched converter is a boost converter.

5. The method of claim 1 wherein said DC-to-DC converter is a LDO converter.

6. The method of claim 1 wherein an input current of the power management unit is controlled in a way that it must not exceed a defined maximum current limit.

7. The method of claim 1 wherein said sensing of the input current is performed by comparing a voltage across a pass transistor switch of an active power path with an voltage across a sensing transistor of the current sensing means, which is scaled and matched in regard of the pass transistor and wherein a reference current is imposed on it.

8. A system to convert DC-to-DC voltage from one of multiple power sources having a current limit and improved performance comprising:

a multiplexing switch unit having multiple power inputs and a single power outputs, wherein each input branch of the multiplexer switch is connected to one of the multiple power source and the single power output of the multiplexing switch is connected is to an input of DC-to-DC converter, wherein each input branch of the multiplexing switch unit comprises a pass transistor switch and current sensing means attached to the pass transistor switch, and wherein only one of the input branches is forming an active power path through said multiplexing switch to the input of the DC-to-DC converter, and wherein a signal output of the multiplexing switch is configured to providing current sensing results of the current sensing means of the active power path to a current comparing means;

said current comparing means, wherein the current comparing means is configured to receive current sensing results from said active power path capable of initiating, in case a current through said active power path reaches a maximum current limit, a signal to the DC-to-DC converter to reduce a current drawn by a load of the DC-to-DC converter; and said DC-to-DC converter.

9. The system of claim 8 wherein said DC-to-DC converter unit is a switched converter.

10. The system of claim 8 wherein said switched converter is a buck converter.

11. The system of claim 8 wherein said switched converter is a boost converter.

12. The system of claim 8 wherein said DC-to-DC converter unit is a LDO converter.

13. The system of claim 8 wherein each of said current sensing means comprises:

a current sensing transistor wherein a first terminal is connected to the first terminal of the correspondent pass transistor switch and a second terminal is connected to the current comparing means and a gate of the current sensing transistor is connected to a gate of the pass transistor switch and wherein the current sensing transistor is matched to said pass transistor switch and is significantly smaller than said pass transistor switch.

14. The system of claim 13 wherein said pass transistor switch and said current sensing transistor are both PMOS transistors.

15. The system of claim 13 wherein said pass transistor switch and said current sensing transistor have a scale factor in the order of magnitude of 10000:1.

16. The system of claim 13 wherein all said current sensing means are sharing said current comparing means.

17. The system of claim 16, wherein said current comparing means comprises:

a voltage comparator, comparing a voltage of the output of the active power path with a voltage of the current sensing means of the active power path, wherein the output of the voltage comparator is an input of a control unit;

a reference current source, wherein the reference current can be set by the control unit; and said control unit providing a signal to the DC-to-DC converter to reduce a current drawn by a load of the DC-to-DC converter in case a current through said active power path reaches a maximum current limit.

* * * * *

UNITED STATES PATENT AND TRADEMARK OFFICE
CERTIFICATE OF CORRECTION

PATENT NO. : 8,937,403 B2
APPLICATION NO. : 13/135159
DATED : January 20, 2015
INVENTOR(S) : Stefano Scaldaferri et al.

It is certified that error appears in the above-identified patent and that said Letters Patent is hereby corrected as shown below:

Title page item (75), delete third Inventor "Eric Marschalkowski, Kirchheim/Teck-Nabern (DE)" and replace with -- Eric Marschalkowski, Inning, (DE) --.

Signed and Sealed this
Twelfth Day of May, 2015

Michelle K. Lee
*Director of the United States Patent and Trademark Office*